Dec. 1, 1970  R. L. DEGA  3,543,407
LIP SEAL ECCENTRICITY GAGE
Filed Oct. 3, 1968  2 Sheets-Sheet 2

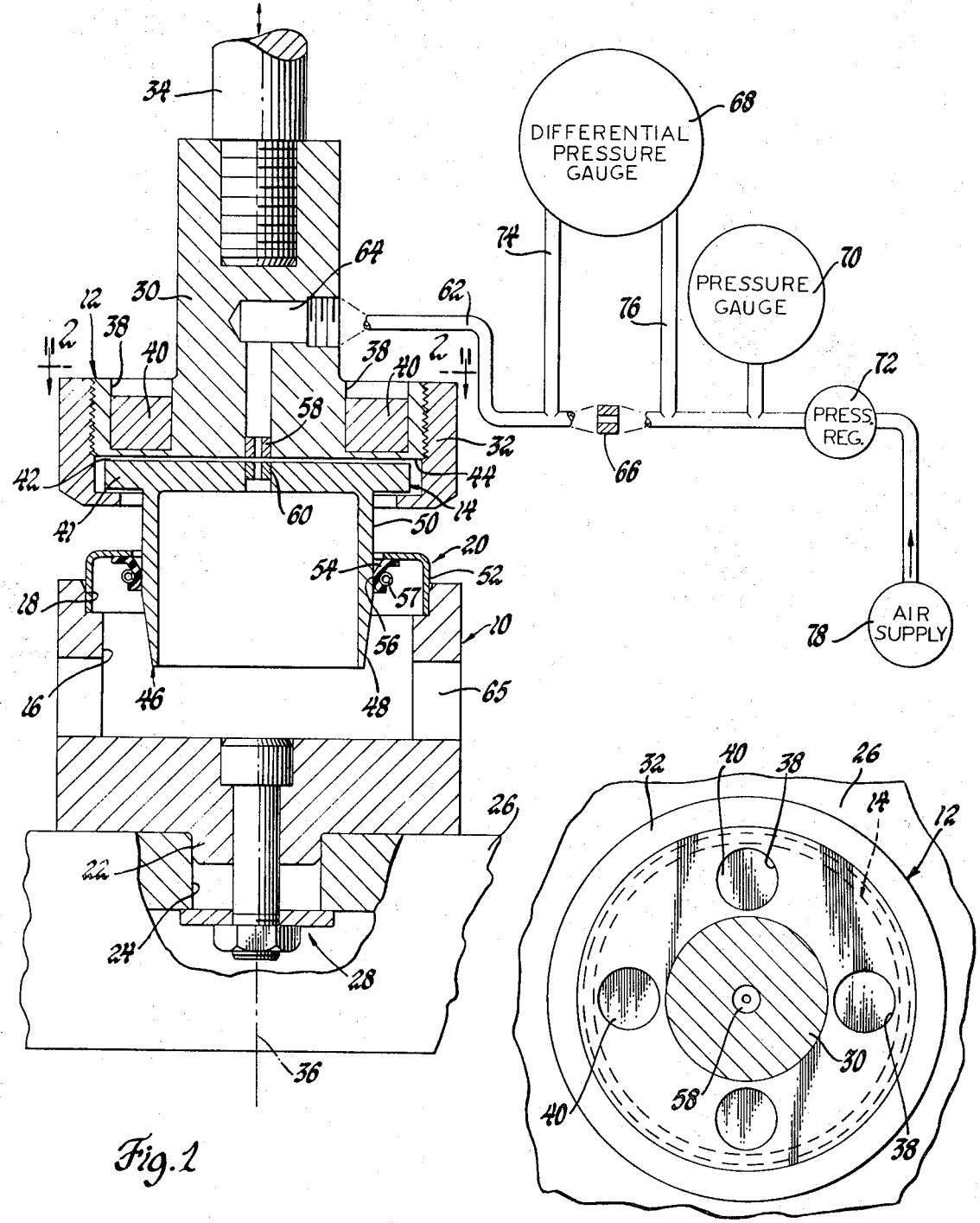

INVENTOR.
Robert L. Dega
BY
E.J. Biskup
ATTORNEY

United States Patent Office 3,543,407
Patented Dec. 1, 1970

3,543,407
LIP SEAL ECCENTRICITY GAGE
Robert L. Dega, Mount Clemens, Mich., assignor to General Motors Corporation, Detroit, Mich., a corporation of Delaware
Filed Oct. 3, 1968, Ser. No. 764,764
Int. Cl. G01b 3/30
U.S. Cl. 33—180
7 Claims

ABSTRACT OF THE DISCLOSURE

A gage for measuring the eccentricity of the seal lip to the seal casing in a lip-type seal wherein the seal casing is concentrically mounted on a fixed support and a mandrel mounted on an axially movable support is inserted through and into engagement with the seal lip. The mandrel is axially supported by a magnetic field or air pressure but is free to move radially into alignment with the axis of the seal lip. The radial distance or eccentricity between the axes of the seal lip and the seal casing is indicated by an electrical sensing or an air gaging system associated with the mandrel.

---

One of the parameters which must be controlled to provide proper sealing on rotary shafts is the seal lip eccentricity. As commonly used, the term refers to the radial displacement of the axis of seal lip with respect to the axis of the seal casing outer diameter. Because the seal lip eccentricity is a critical factor in the proper operation of any lip-type seal, it is desirable to check this parameter on a one hundred percent (100%) basis to detect seals having an eccentricity in excess of the recognized limits for a given sealing application.

One of the primary effects of the eccentricity in the operation of the shaft seal is that of a change in radial lip pressure. Thus, when an eccentric seal lip is assembled over a shaft, the opposite sides of the seal lip will have different interference and lip pressure values. In other words, a high lip pressure exists on the high interference side whereas a low lip pressure exists on the opposite side. In addition, the seal lip eccentricity can be additive to the shaft and the housing eccentricities thereby further increasing the unevenness of the seal lip pressure. Unlike other materials, the coefficient of friction between an elastomeric member and a metallic member increases with the applied load. Thus, the energy dissipated by the seal lip on the high interference side increases considerably, a condition which accelerates seal lip wear and, in certain instances, results in a premature failure of the elastomeric material.

The variations in lip pressure also produces an uneven wear pattern on the seal lip at the seal-shaft interface that is conducive to creating additional leakage problems. With an uneven wear or contact pattern, the oil film adjacent the narrow section of the contact pattern will be swept under the seal lip with a component of force toward the wide section and thereafter carried from beneath the seal lip to the exposed shaft surface. Thus, the geometry of the wear pattern creates a fluid leak by mechanical conductance.

Realizing the necessity for controlling the eccentricity in shaft seals, a number of proposals have been made to measure its value. In one proposal, a shaft seal is mounted on a rotating arbor and, by using a dial indicator in contact with the seal casing, maximum and minimum readings are recorded. The readings are then averaged to arrive at an eccentricity figure. In other proposals, the seal is mounted on a "V" block and an indicator measures the variations in roundness of the seal lip as the seal casing is rotated. However, variations in roundness caused by elastomer shrinkage, hardness, and other factors all appear in the eccentricity reading. As in the other proposal, the minimum and maximum reading must be averaged to arrive at an eccentricity figure. Accordingly, these proposals are not entirely satisfactory in that they measure eccentricity of the lip in the free state without compensating for the above-noted variations and will, in many instances, reject shaft seals which, in installation, would operate satisfactory.

A more reliable method of measuring shaft seal eccentricity is shown and described in my prior patent, Dega 3,073,033, assigned to the assignee of the present invention, in which the seal is mounted over a rotatable mandrel which simulates the operational orientation of the seal lip with respect to the casing. An indicating device contacts the seal casing and the relative radial displacement thereof as the seal is rotated is an indicator of the assembled seal lip eccentricity. However, this instrument is intended primarily as a laboratory instrument and, while it can be used as a one hundred percent (100%) inspection device for low volume-high quality seals or a random sample inspection tool, it is not altogether adaptable for one hundred percent (100%) inspection for high volume seal production.

Accordingly, it is a general object of the present invention to provide an instrument designed for measuring the eccentricity of the seal lip with respect to the seal casing on a commercial lip-type seal and, in particular, to provide an eccentricity gage which is capable of checking this parameter on a one hundred percent (100%) basis. This is accomplished by mounting the seal casing concentrically on a fixed support and determining the eccentricity with a mandrel which is insertable through and alignable with the seal lip and is supported by an axially movable support.

It is another object of the present invention to provide an eccentricity gage which eliminates any extraneous radial forces on the seal lip during the inspection operation and thereby permits an accurate determination of the lip eccentricity. This feature is achieved by using a magnetic field or air pressure to axially support the mandrel. Each of these systems axially locates the mandrel but does not exert a holding force against movement in a radial plane. Accordingly, radial force between the second support structure, the mandrel, and the seal lip are precluded and extraneous deformation of the seal lip is eliminated.

A further object of the present invention is to provide an instrument for measuring the eccentricity of a shaft seal which eliminates the need for the averaging technique described above. Inasmuch as the goal of one hundred percent (100%) inspection is to reject only those seals which exceed a predetermined eccentricity value and not to record the degrees therebetween, the present invention incorporates a sensing device, which may either be an air gaging system or an electrical sensing system, that visually indicates when the eccentricity has exceeded the tolerable limits. In this manner, acceptance or rejection of a given seal can be based on visual readings without the necessity of intermediate steps.

These and other advantages of the present invention will be apparent to one skilled in the art upon reading the following detailed description, reference being made to the accompanying drawings in which:

FIG. 1 is a side cross-sectional view of an embodiment of the present seal eccentricity gage incorporating an air gaging sensing system;

FIG. 2 is a view taken along line 2—2 of FIG. 1;

Figures 3, 4:
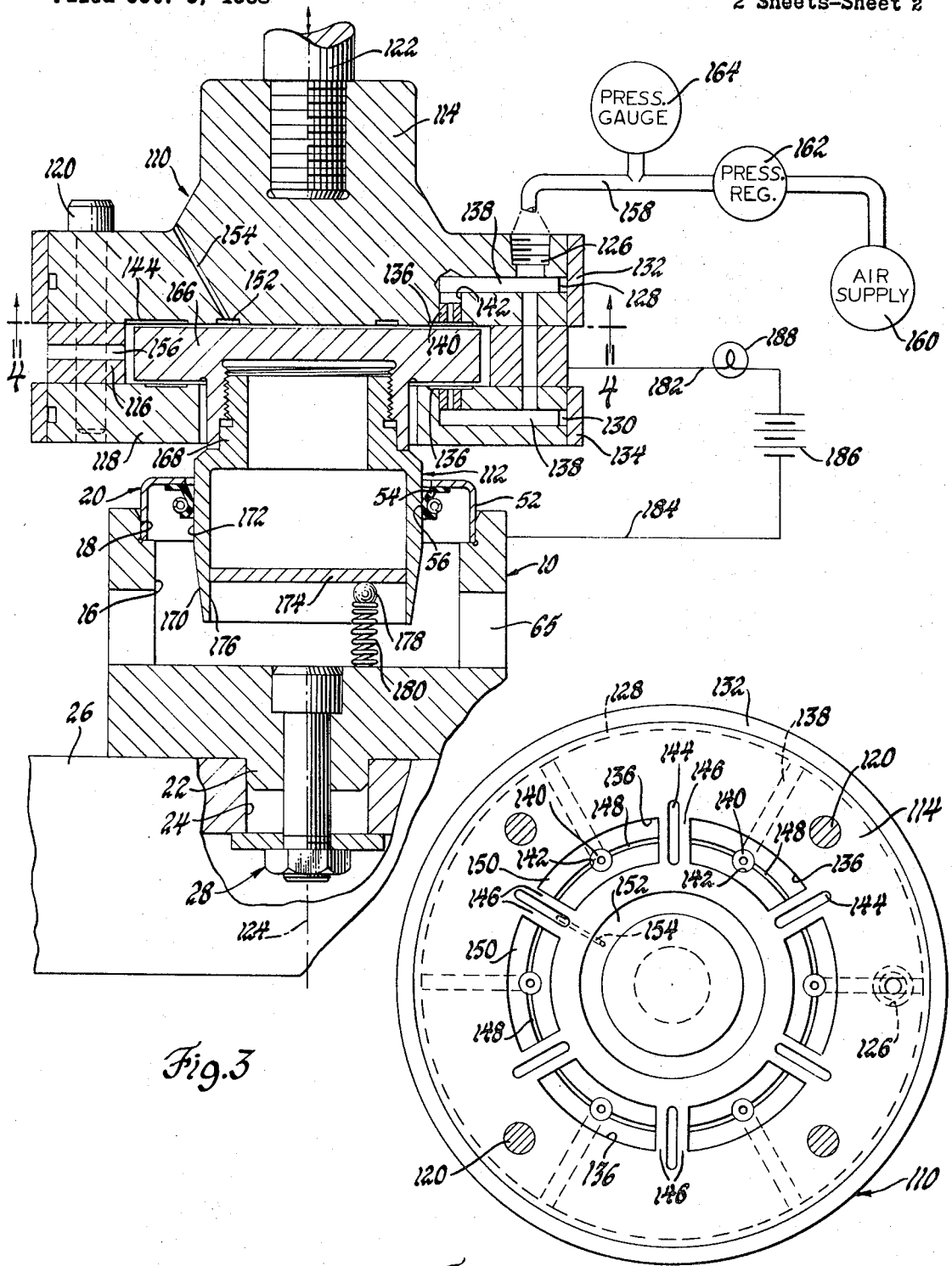
FIG. 3 is a side cross-sectional view of another embodiment of the present eccentricity gage incorporating an electrical sensing system.
FIG. 4 is a view taken along line 4—4 of FIG. 3.

Referring to FIG. 1, a seal eccentricity gage made in accordance with the present invention generally comprises a fixed support 10, an axially movable support or spindle 12, and an indicating mandrel 14. The support member 10 includes a centrally disposed bore 16 and a concentrically located counterbore 18 which receives and retains a test seal 20. A hub 22 is formed at the lower end of the support member 10. The hub 22 is concentrically received within a hole 24 formed in a fixed base plate 26 and is secured thereto by a fastener assembly 28.

The spindle 12 is formed of a nonmagnetic material such as aluminum and generally comprises a gage head 30 and a retaining collar 32. The gage head 30 is threaded at an upper end to a shaft 34 which is connected to a suitable actuator such as an air cylinder. Upon actuation, the shaft 34 moves the spindle 12 axially along an assembly axis 36. As shown in FIG. 2, a plurality of circumferentially spaced holes 38 are formed in the upper surface of the gage head 30. A cylindrical permanent magnet 40 formed of a high coercive effect magnetic material is inserted within each of the holes 38. The retaining collar 32 is threaded over a lower radially outwardly facing surface of the gage head 30 and, as will be described below, serves to limit the movement of the mandrel 14 in a radial or horizontal plane.

The mandrel 14 is formed of a magnetic metal such as steel and includes a circular head section 41 having an upper planar surface 42 in spaced relation to a planar surface 44 formed on the gage head 30. The surfaces 42 and 44 are separated by a thin film of low viscosity lubricating oil and, to insure proper axial alignment, the surfaces 42 and 44 should have a flatness in the order of .0001 inch.

In assembly, the flux field of the magnets attracts and axially supports the mandrel 14 and maintains the surfaces 42 and 44 in intimate contact except for the thin film of lubricant. Inasmuch as any magnetic field is relatively weak in shear, the mandrel 14 is essentially unrestrained or free-floating in a plane perpendicular to the assembly axis 36. The aforementioned retaining collar 32 is used as a limit ring for the mandrel 14 to keep the latter from sliding off the support member 12.

The mandrel 14 further includes an axially extending plunger 46 having a conical entrance surface 48 and an axially extending gaging surface 50. In order to simulate actual conditions, the outer diameter of the gaging surface 50 is equal to the outer diameter of the shafts on which the seals 20 are adapted to be used.

As shown in FIG. 1, the shaft seals 20 to be tested generally comprise an annular metallic casing 52 and an elastomeric sealing annulus 54 terminating with a radially inwardly facing seal lip 56. A coiled helical spring 57 is retained in a groove formed in an outer surface of the sealing annulus 54 and serves to radially bias the seal lip 56 into sealing engagement with a shaft.

The indicating system for the subject device generally comprises an external gaging system and a pair of orifice plugs 58 and 60 located in axial openings formed in the mandrel head 41 and the gage head 30. The plugs 58 and 60 are in fluid communication with an external conduit 62 via a radial inlet port 64. The air flowing through the plugs is vented to atmosphere through openings 65 formed in the fixed support 10. When the mandrel 14 is axially aligned with the assembly axis 36, the orifices of the plugs 58 and 60 are aligned and a maximum flow path is established therebetween. As the mandrel 14 is moved in a radial plane, the flow path will progressively decrease.

The gaging system generally comprises a third orifice plug 66, a differential pressure gage 68, a pressure gage 70, and a pressure regulator 72. The differential pressure gage 68 is connected to the conduit 62 on opposite sides of the plug 66 by branch conduits 74 and 76. The pressure drop across the plug 66 as air flows therethrough from an air supply 78 is indicated by the differential pressure gage 68 and controlled by the pressure regulator 72 and the pressure gage 70. To increase the sensitivity of the system, the lengths and orifice sizes for the various plugs are identical.

To measure the seal eccentricity or the radial distance between the axes of the seal lip 56 and outer surface of the casing 52, the spindle 12 is actuated to an upward position and the seal 20 is concentrically located within the counterbore 18. The upper support member is then moved downwardly and the plunger 46 is gradually inserted past the seal lip 56 until the latter engages the gaging surface 50. To facilitate insertion of the plunger 46, the gaging surface 50 may be coated with a light lubricating oil or a suitable low-friction synthetic material. In this position, the magnetic field will axially restrain the mandrel 14 but, inasmuch as the magnetic field is relatively weak in shear, the surface 42 is essentially unrestrained with respect to the surface 44 in a radial or horizontal plane. Thus, the plunger 46 is free-floating and will align itself to the axis of the seal lip 56 without producing any extraneous radial forces on the sealing annulus 54. Additionally, any extraneous eccentricities are avoided by concentrically forming the gaging surface 50 and the counterbore 18. Therefore, if an eccentricity exists between casing 52 and the seal lip 56, the orifices in the plugs 58 and 60 will similarly be eccentrically positioned and the flow path therebetween will be reduced. The reduction in flow path will reduce the flow of air through the plug 66 thereby reducing the pressure drop across the orifice. Accordingly, a maximum pressure drop occurs across the plug 66 when the plugs 58 and 60 are concentrically aligned and, for increasing eccentricity, the pressure drop is progressively decreased. This change in pressure is sensed and visually indicated by the differential pressure gage 68.

In testing the above-described eccentricity gage, it was found that a pressure of 2 p.s.i. used in combination with plugs having .020 inch orifices would produce a pressure differential of approximately 12 inches of water pressure within a .015 inch eccentricity range. With these dimensions, it was possible to calibrate the differential pressure gage 68 to give indications of .001 increments as well as visually indicating when the test seal 20 exceeded the tolerable eccentricity limits.

A modification of the above-described device is shown in FIGS. 3 and 4 and generally incorporates a hydrostatic air bearing for supporting the mandrel and an electrical sensing system for indicating the shaft seal eccentricity. Inasmuch as the lower support 10 and the shaft seals 20 are identical to those described above, the prior numerical designations will be retained.

As shown in FIG. 3, this embodiment generally comprises an axially movable support or spindle 110 and a mandrel 112. The spindle 110 includes a gage head 114, a collar 116, and a bottom plate 118, all of which are clamped together by means of bolts 120. A shaft 122 is threaded to the upper end of the gage head 114. The shaft 122 is connected to a suitable actuator, such as an air cylinder, for moving the spindle 110 relative to the lower support 10 along an assembly axis 124.

The spindle 110 is provided with an air distribution system which comprises an intake port 126 and a pair of air distribution grooves 128 and 130 formed in the outer periphery of the gage head 114 and the bottom plate 118, respectively. Collars 132 and 134 are fitted over the outer peripheries of the gage head 114 and the bottom plate 118 to seal the grooves 128 and 130. The air in the grooves 128 and 130 is directed to air support pads 136 by radially inwardly extending ports 138. The support pads 136 are fluidly connected to the ports 138 by orifice plugs 140 located in axially extending holes 142. The plugs 140 are used to provide substantially equal air flow and pressure conditions at each of the support pads 136.

The air bearings formed in the gage head 114 and the bottom plate 118 are substantially identical with the exceptions to be hereafter noted, and further discussion will be referenced to FIG. 4 showing the structure for the gage head 114. As shown, the bearings generally comprise six circumferentially spaced support pads 136 that are mutually separated by radially extending stabilizing slots 144 and lands 146. Each support pad 136 includes a circumferential distribution groove 148 which communicates with the plugs 140 and distributes air within recessed areas 150. Air flowing inwardly past the recessed areas 150 is collected in an annular channel 152 and is vented to atmosphere by a vent hole 154. The bearings for the bottom plate 118 do not include the channel 152 inasmuch as air flows inwardly between the bottom plate 118 and the mandrel 112 to atmosphere. As shown in FIG. 3, the air flowing outwardly past the recessed areas 150 is vented to atmosphere through a radially extending opening 156 formed in the collar 116.

The air distribution system for the air bearings comprises a conduit 158 that is connected between an air supply 160 and the inlet port 126. The flow of air from the supply 160 is conventionally controlled by a pressure regulator 162 and a pressure gage 164.

In operation, the air flowing to the support pads 136 creates a thin hydrostatic film at the opposed interfaces thereby supporting the mandrel 112 axially on the spindle 110. The stabilizing slots 144 create a pressure drop across the lands 146 thereby isolating the individual support pads 136 and preventing any localized pressure buildup that could cause an axial misalignment of the mandrel 112. However, the air flow has no effect with regard to radial motion of the mandrel 112 and the latter is esentially unrestrained in a plane perpendiuclar to the assembly axis 124.

The mandrel 112 generally comprises a circular head 166 having an axially extending plunger 168 threaded thereto. As in the previously described embodiment, the plunger 168 has a conical entrance surface 170 to facilitate insertion past the seal lip 56 and a concentric gaging surface 172 having a diameter equal to that of the shaft on which the seal 20 is designed to operate. The spacing between the outer diameter of the head 166 and the inner diameter of the collar 116 is equal to the maximum tolerable eccentricity of the seal lip 56 with respect to the casing 52.

A circular plate 174 is pressed within a centrally located bore 176 formed in the plunger 168. A ball bearing 178 and spring 180 are mounted on the lower support member 10 and serve to electrically connect the mandrel 112 to the lower support member 10. Conductors 182 and 184 electrically connect the collar 116 and the lower support member 10 with an electrical power source 186. An indicating light 188 is electrically connected in series to the power source 186 and the collar 116.

In operation, the upper support member 110 is actuated to an upper position and a test seal 20 is located within the counterbore 18. The upper support member 110 is then moved downwardly and the plunger 168 is gradually inserted through the seal 20 until the gaging surface 172 engages the seal lip 56. In this position, the air bearings axially support the mandrel 112 but permit the plunger 168 to move freely in a horizontal plane into alignment with the axis of the seal lip 56. Within the tolerable eccentricity limits, the head 166 is electrically insulated by the air film from the gage head 114, the collar 116, and the bottom plate 118. However, when the eccentricity has exceeded the tolerable limit, the head 166 contacts the collar 116 thereby completing an electrical circuit and illuminating the indicating light 188.

It should be apparent that the mandrel supporting features and the sensing features of the above-described embodiments can be interchanged while accomplishing the desired results of measuring shaft seal eccentricity. In other words, the embodiment shown in FIG. 1 can incorporate an electrical sensing system by suitable sizing of the collar 32. Similarly, the embodiment in FIG. 3 can be provided with an air gage sensing system by appropriate modification of the gage head 114 and the mandrel head 166. Moreover, it will be appreciated that wide ranges of seal sizes having varying tolerable eccentricities can be tested by changing the mandrel size and modifying the sensing devices.

Although only one form of this invention has been shown and described, other forms will be readily apparent to those skilled in the art. Therefore, it is not intended to limit the scope of this invention by the embodiment selected for the purpose of this disclosure but only by the claims which follow.

I claim:

1. An apparatus for measuring the eccentricity between the inner diameter and the outer diameter of annular articles, said apparatus comprising: a first fixture for supporting said article at said outer diameter concentrically with the assembly axis of said apparatus, a second fixture axially movable along said assembly axis relative to said first fixture; a mandrel having an outer surface insertable axially through said article to a position where said inner diameter of said article engages the outer surface of said mandrel; means axially restraining said mandrel on said second fixture while permitting essentially unrestrained movement of said mandrel into alignment with said inner diameter in a plane normal to said assembly axis; and sensing means associated with said mandrel for determining the eccentricity of said inner diameter with respect to said outer diameter.

2. A gage for measuring the eccentricity between the inner diameter and the outer diameter of a shaft seal, said shaft seal including an elastomeric sealing annulus terminating at said inner diameter with an annular seal lip which is adapted to sealingly engage a shaft in assembly, said gage comprising: a pair of support members relatively movable along an assembly axis, one of said support members being adapted to support said shaft seal at said outer diameter concentrically with and locate said seal lip in a plane normal to the assembly axis; a mandrel including a gaging surface having a diameter equal to said shaft, said gaging surface being axially insertable through said shaft seal such that said seal lip is in engagement therewith; magnetic means associated with the other of said support members for axially restraining said mandrel while permitting essentially unrestrained movement of said gaging surface into alignment with said seal lip in a plane normal to said assembly; and sensing means associated with said mandrel for determining the eccentricity of said gaging surface with respect to said outer diameter of the seal.

3. The invention recited in claim 2 wherein said sensing means includes orifices in the mandrel and the other of said support member which are aligned when said gaging surface is concentrically aligned with said assembly axis, and air gaging means including a third orifice and a differential pressure gage fluidly communicating with said orifices, said differential pressure gage being responsive to changes in pressure across said third orifice as said orifices are relatively moved as said gaging surface is aligned with said seal lip and thereby indicate the eccentricity between said inner diameter and said outer diameter of said shaft seal.

4. A gage for measuring the eccentricity between the inner diameter and the outer diameter of a shaft seal, said shaft seal including an elastomeric sealing annulus terminating at said inner diameter with an annular seal lip which is adapted to sealingly engage a shaft in assembly, said gage comprising: a pair of support members relatively movable along an assembly axis, one of said support members being adapted to support said shaft seal at said outer diameter concentrically with and locate said seal lip in a plane normal to said assembly axis; a mandrel including a gaging surface having a diameter equal to said shaft, said gaging surface being axially insertable through said sealing annulus such that said seal lip is in engagement therewith, said mandrel having flat opposed planar surfaces located normal to said gaging surface;

air bearing means associated with the other of said support members acting on said opposed planar surfaces to axially restrain said mandrel while permitting essentially unrestrained movement of said gaging surface into alignment with said seal lip in a plane normal to said assembly axis; and sensing means associated with said mandrel for indicating the eccentricity of said seal lip with respect to said outer diameter.

5. The invention as recited in claim 4 wherein said sensing means includes; electrical indicating means including a power supply and an indicating light electrically connected between said mandrel and said other of said support members; and surfaces formed on said mandrel and said other of said support members having relative diameters equal to the amount of permissible eccentricity between said inner diameter and said outer diameter of said shaft seal, said mandrel being electrically insulated from said other of said support members by said air bearing means until said permissible eccentricity has been exceeded at which time said surfaces contact each other to complete an electrical circuit through said indicating light to thereby illuminate the latter.

6. A gage for measuring the eccentricity between the inner diameter and outer diameter of a shaft seal, said shaft seal including an elastomeric sealing annulus terminating at said inner diameter with an annular seal lip which is adapted to sealingly engage a shaft in assembly, said gage comprising: a first support member for supporting and positioning said shaft seal at said outer diameter concentrically with an assembly axis; a second support member movable relative to said first support member along said assembly axis; a mandrel including a gaging surface having a diameter equal to said shaft, said gaging surface being insertable axially through said sealing annulus to a position of engagement with said seal lip; means axially restraining said mandrel on said second support member while permitting essentially unrestrained movement in a plane normal to the seal lip; an air supplying conduit including a first orifice associated with said second support member; a second orifice associated with said mandrel, said first orifice and said second orifice being aligned when said mandrel diameter is concentrically positioned with respect to said second support member; and air gaging means including an air pressure indicating device and a third orifice fluidly communicating with said air pressure conduit and sensing the relative position of said first orifice with respect to said second orifice whereby the eccentricity between said seal lip with respect to said outer diameter is indicated by said air pressure indicating device.

7. A gage for measuring the eccentricity between the inner diameter and outer diameter of a shaft seal, said shaft seal including an elastomeric sealing annulus terminating at said inner diameter with an annular seal lip which is adapted to sealingly engage a shaft in assembly, said gage comprising: a first support member for supporting and positioning said shaft seal at said outer diameter concentrically with an assembly axis; a second support member movable relative to said first support member along said assembly axis, said second support member having an axially extending surface with a first diameter; a mandrel including a gaging surface having a diameter equal to said shaft, said gaging surface being insertable axially through said sealing annulus to a position of engagement with said seal lip, said mandrel having an axially extending surface of a second diameter, said first diameter being larger than said second diameter by an amount equal to the permissible eccentricity between the inner diameter and the outer diameter of said shaft seal; means axially restraining said mandrel on said second support member while permitting essentially unrestrained movement in a plane normal to the seal lip; and electrical indicating means including a power supply and an indicating light electrically connected between said mandrel and said second support member whereby said light will be illuminated when said first diameter contacts said second diameter to thereby indicate that said permissible eccentricity of said shaft seal has been exceeded.

References Cited
UNITED STATES PATENTS

| | | | |
|---|---|---|---|
| 2,929,147 | 3/1960 | Hall | 33—174 |
| 3,073,033 | 1/1963 | Dega | 33—174 |
| 3,144,718 | 8/1964 | Brehm | 33—174 |
| 3,284,910 | 11/1966 | Klasek | 33—180 |

WILLIAM D. MARTIN, JR., Primary Examiner

U.S. Cl. X.R.

33—174